United States Patent Office 3,270,469
Patented Sept. 6, 1966

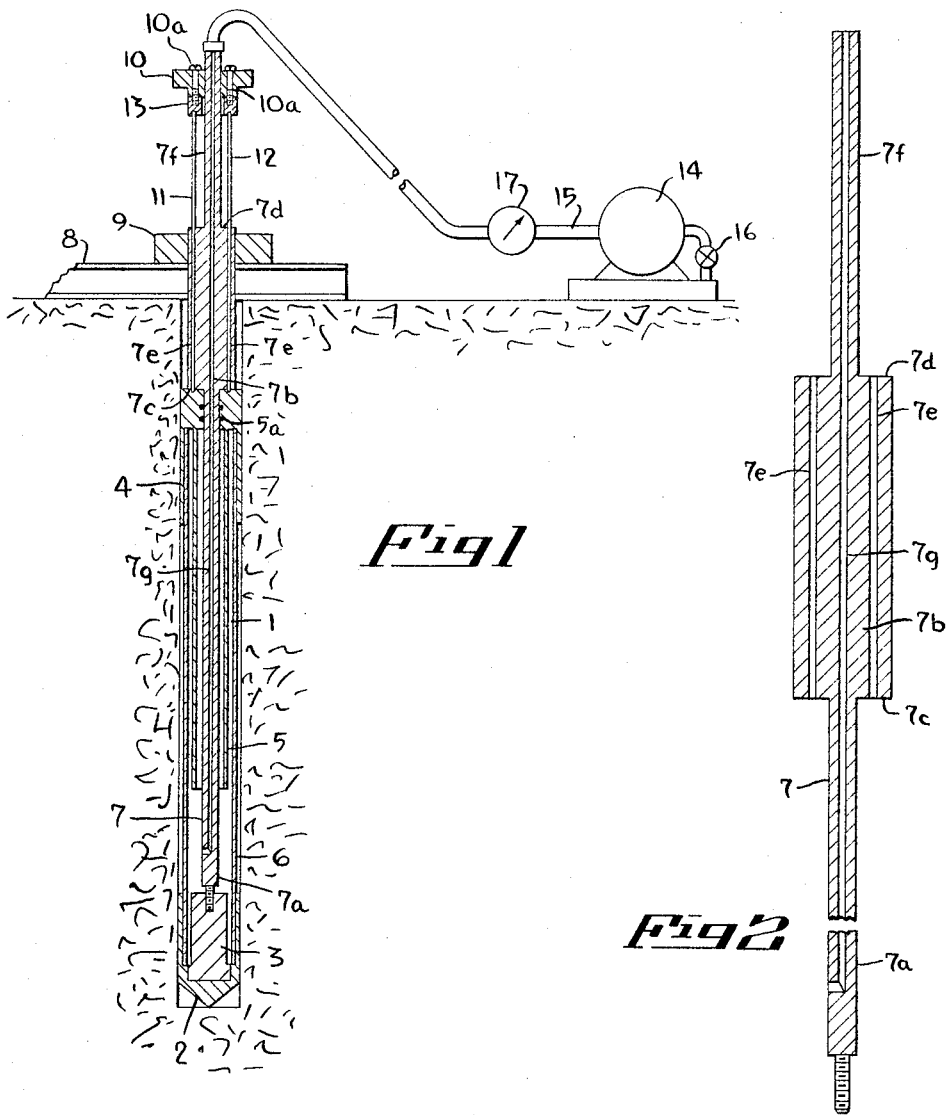

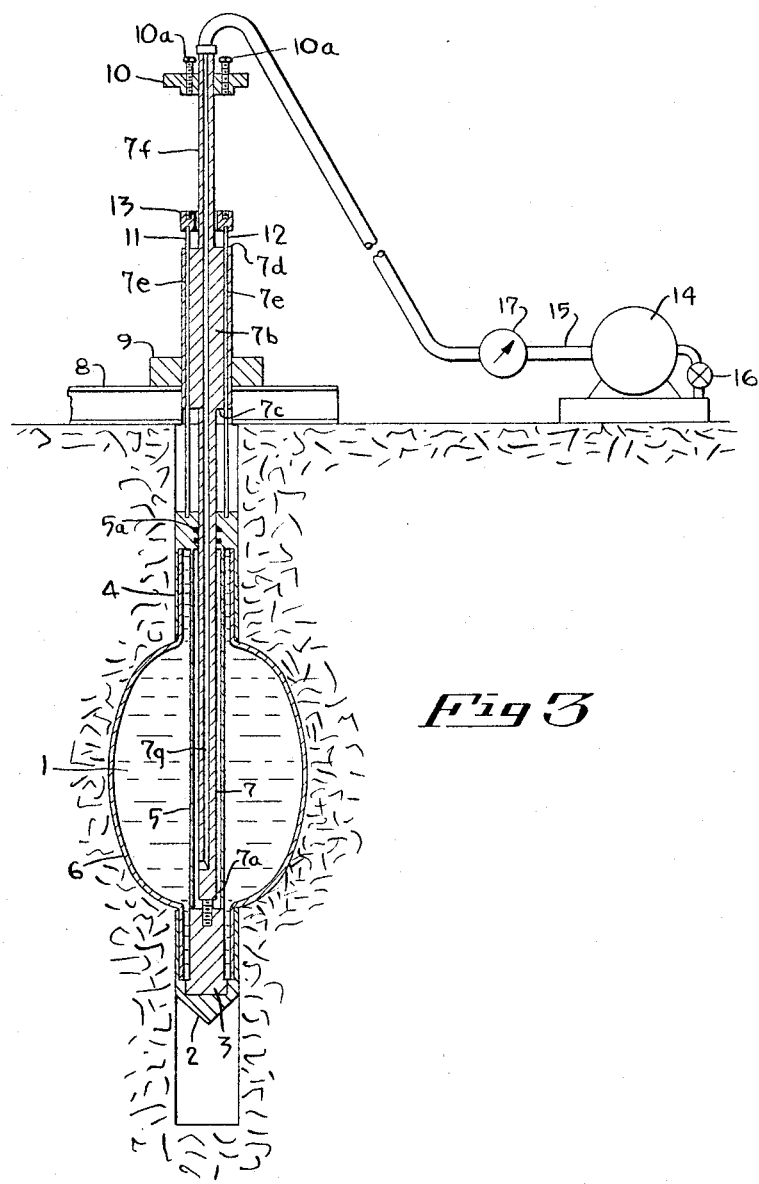

3,270,469
EXPANSIBLE, REMOVABLE GROUND
ANCHORING DEVICE
Etienne Clément Debiton, Levallois-Perret, France,
assignor to Centre Experimental de Recherches et
d'Etudes du Batiment et des T.P., Paris, France
Filed Jan. 16, 1964, Ser. No. 338,065
Claims priority, application France, Jan. 28, 1963,
922,851
2 Claims. (Cl. 52—2)

The necessity of employing anchoring means, for example ground ties, arises in several fields of technology. Such devices must be capable of withstanding great stresses and yet must be easy to install. In addition, where a permanent anchoring is not required, as in the case of portable engines or temporary structures the anchoring means should be integrally recoverable, intact and ready for re-use.

The present invention relates to a method of anchoring in a suitable medium, comprising the steps of drilling a hole in the medium, introducing an inflatable element into the hole, inflating the element by means of a pressure fluid in such a manner that it engages closely against the walls of the hole.

The invention also relates to a removable and re-usable anchoring device, comprising an inflatable envelope connected to an anchor pin. The device is introduced into the ground or other medium the anchoring is to be effected, for example, within a hole drilled for this purpose and the envelope is inflated by means of a pressure fluid, for example water, so that it becomes encased within the medium. The anchor pin connected to the envelope is thus linked to a mass solidly encased in the medium and constitutes a particularly stable anchor point.

Various means may be employed to connect the inflatable envelope to the anchor pin. For example, the anchor pin can be screwed into a sleeve integral with the envelope. This connection may be either at the base or at the summit of the envelope, so that the stresses acting on the pin cause the envelope to operate either by traction or by compression, the latter being in general preferable.

The inflatable envelope may be of various shapes and may consist of diverse materials. Its external surface may have ridges which increase its adherence to the surrounding material. Further, in order to provide it with sufficient mechanical resistance, it may be re-inforced at sensitive points. In one embodiment, there is employed a double envelope constituted by an internal, elastically inflatable chamber, made of rubber for example, and by an external envelope forming a particularly resistant corrugated armouring. These two elements may be separated by an expandible sleeve, capable of withstanding tractive stresses. The envelope may additionally comprise an internal structure, subdivided into several distinct cavities. Means may be provided to limit or to control the deformation of the envelope in some directions. Auxiliary devices serve to position the envelope, to effect the circulation of the fluid when the envelope is inflated or deflated, to measure the internal pressure of the envelope, the amount of the injected fluid and the stress applied to the anchor pin. The admission and the evacuation of the fluid may for example be effected by means of an axial conduit located within the anchor pin or by means of longitudinal grooves on the pin.

A fundamental feature of the invention is that the device as a whole can be essentially and integrally recovered after deflating the envelope, the device thus recovered being intact and suitable for re-use.

In the accompanying drawings:

FIGURE 1 is a sectional view of an anchoring device according to the invention in position in a bore hole in the ground prior to the introduction of the fluid into an envelope;

FIGURE 2 is a detailed section of an anchor pin shown in FIGURE 1; and

FIGURE 3 is a sectional view similar to that of FIGURE 1, but the envelope inflated.

FIGURE 1 illustrates the anchoring device after its introduction into a vertical bore hole. The device comprises an inflatable envelope 1, which is a cylinder made of a rubbery material. The two extremities of the cylinder are held between an external sheath and an internal sleeve, namely a sheath 2 and sleeve 3 at the bottom lower portion and a sheath 4 and a sleeve 5 at the top. The lower sleeve 3 is solid, while the upper sleeve is a hollow cylinder. The envelope is reinforced by canvas strips 6 between the sheath and the sleeve and especially so at its base.

A vertical anchor pin 7 extends axially from the lower sleeve 3, to emerge outside the bore hole. This anchor pin is separately illustrated in FIGURE 2 and comprises at its lower portion a cylinder 7a adjustably screwed into the lower sleeve 3. This pin passes axially through the envelope, the hollow sleeve 5, the sheath 4 and is separated from the hollow sleeve 5 by packing rings 5a integral with the sleeve 5. Above the sheath 4, the anchor pin 7 widens into a cylinder 7b of a diameter greater than that of cylinder 7a, this increased diameter forming an abutment 7c, which rests on the sheath 4. This abutment 7c permitting the anchor pin to be displaced upwards in relation to the sleeve 5, but preventing downward movement. The cylinder 7b extends the pin in the upward direction and emerged from the bore hole. Outside the bore hole, it passes through an element 8 which is to be fastened to the ground, to terminate, if desired, in a blocking element 9 above the element 8. The cylinder 7b terminates on an abutment 7d analogous to abutment 7c. That part of cylinder 7b which extends beyond cylinder 7a is pierced by two vertical bores 7e parallel to the axis and located diametrally opposite each other. The pin 7 terminates in a cylinder 7f, which has the same dimensions as the cylinder 7a. On the extremity of cylinder 7f is mounted a collar 10. Two vertical tensioning bolts 11 and 12 are fixed on the upper sheath 4, freely passing through the holes 7e and ending at a tension collar 13 which surrounds cylinder 7f.

The pin 7 is further traversed over almost its entire length by an axial fluid feed conduit 7g which extends from the top of the pin to open at the lower portion of the cylinder 7a, in the interior of envelope 1. The fluid circuit is provided with a pump 14, a pipe 15 extending from the pump and connected to the pin 7, a return valve 16 and instruments 17 for measuring the pressure and the volume of the injected fluid. In the application herein described, the fluid is a liquid, for example water.

The device is introduced into the bore hole when the tension collar 13 is in engagement with the traction collar 10, so that the distance between the lower sleeve 3 and the upper sleeve 5 is at a maximum and that the envelope 1 is tensioned and held in its cylindrical form by rods 11 and 12 which are attached to the collar 13, as shown in FIGURE 1. The engagement between the collars 10 and 13 may be by any releasable conventional engaging means, such as bolts 10a.

After disengaging the collars 13 and 10, the pump is set in motion to inject the fluid into the envelope. The envelope expands slowly, embedding itself into the ground. During this expansion, the base and the top of the envelope 1 move towards each other, the anchor pin sliding in the packing rings 5a of the sleeve 5 and in the interior of the blocking element 9, in which it is capable of movement, while the tensioning rods 11 and 12 slide in the holes 7e. This movement ceases when the two sleeves 3 and 5 are practically in contact. The deformation of envelope 1 in vertical direction also ceases in this moment, but further quantities of liquid can still be injected and the envelope can be expanded further since the connection between the sleeves is not fluid tight and, in addition, the hollow upper sleeve 5 may have orifices (not shown).

In a modified embodiment, the contact between the two sleeves can be fluid-tight, so that at the instant when they come into contact the injection of the fluid stops automatically. However, in the illustrated embodiment, the instant where the injection of fluid has to cease and the maximum transversal diameter reached are indicated by the measuring instruments 17, on the basis of numerous preliminary tests serving to calibrate the apparatus, so as to avoid a bursting of the envelope. The device after injection of the liquid is illustrated in FIGURE 3.

The result is a well-established anchoring, constituted by the expanded envelope 1 embedded in the ground. This anchoring means is to be used to tie an element 8 to the ground. The blocking element 9 is joined with the pin 7. By means of this element 9, the pin can be screwed into the lower sleeve 3 until a predetermined blocking couple is reached, corresponding to a predetermined tractive stress exerted on the anchoring. It is to be noted that this stress acts on the lower portion of the envelope 1 which is reinforced by the canvas strips 6 and which thus operates by compression.

To remove the device from the ground, the blocking element 9 and the pin 7 are disengaged, the return valve 16 is opened to decompress the liquid and deflate the envelope. The envelope is returned to its initial form by pulling on the tension collar 13 which is then coupled with the traction collar 10. The collar 13 may be raised by any conventional suitable lifting means, such as a rope and pulley (not shown), well known to those skilled in the art. The device is then in its initial state, as shown in FIGURE 1, and can be withdrawn from the bore hole.

What I claim is:

1. An anchoring device comprising an inflatable flexible vessel adapted to be connected to a fluid source, two opposite sheaths secured to said vessel and being movable in opposite directions towards each other when the vessel is inflated and, respectively, away from each other to deflate the vessel, guide means operable for guiding the sheaths during their movements and to limit the relative movement of the sheaths towards each other including a rigid elongated anchor pin connected to one of the sheaths and at least two rods parallel to the anchor pin and guided in the anchor pin and connected to the other sheath, a traction collar connected to the other end of said anchor pin, and a tension collar connected to the other ends of said rods, the collars abutting when the vessel is deflated, said collars, anchor pin and rods being operable to move apart said sheaths thereby to deflate the vessel when said collars are being moved together into the abutting position.

2. An anchoring device according to claim 1, said anchor pin comprising a cylinder defining a conduit for said fluid, and a sleeve surrounding said cylinder and connected to the other sheath and making abutment contact with said one sheath, thereby limiting the sheath movement towards each other and shutting off said conduit for halting the flow of fluid into the vessel.

References Cited by the Examiner
UNITED STATES PATENTS

| | | | |
|---|---|---|---|
| 1,906,151 | 4/1933 | Goodman | 138—93 |
| 2,309,429 | 1/1943 | Ahern | 138—93 |
| 3,141,534 | 7/1964 | Dunston. | |

FRANK L. ABBOTT, *Primary Examiner.*

RICHARD W. COOKE, Jr., *Examiner.*

L. R. RADANOVIC, M. O. WARNECKE,
*Assistant Examiners.*